United States Patent [19]

Neel et al.

[11] 3,969,277

[45] July 13, 1976

[54] CATALYST FOR HYDROCARBON CONVERSION

[75] Inventors: Emmanuel E. Neel, Grand-Quevilly; Gerard F. Joachimsmann, Rouen, both of France

[73] Assignee: Shell Oil Company, Houston, Tex.

[22] Filed: Jan. 24, 1975

[21] Appl. No.: 543,739

[30] Foreign Application Priority Data

Feb. 13, 1974 France ............................ 74.04834

[52] U.S. Cl. ............................ 252/455 Z; 208/111
[51] Int. Cl.² ..................... B01J 29/06; C10G 13/02
[58] Field of Search ....................... 252/455 Z, 446; 208/111

[56] References Cited

UNITED STATES PATENTS

| | | | |
|---|---|---|---|
| 3,219,590 | 11/1965 | Ribaud | 252/446 X |
| 3,269,934 | 8/1966 | Hansford | 252/455 Z |
| 3,375,204 | 3/1968 | Hoke | 252/455 Z |
| 3,450,644 | 6/1969 | Lanewala et al. | 252/455 Z |
| 3,549,518 | 12/1970 | Mason et al. | 252/455 Z |
| 3,647,681 | 3/1972 | Egan | 252/446 X |
| 3,676,330 | 7/1972 | Plank et al. | 252/455 Z |

Primary Examiner—Carl F. Dees

[57] ABSTRACT

A process for the preparation of a tungsten containing erionite catalyst is disclosed. The novel catalyst is suitable for conversion of hydrocarbons and is particularly suitable for selective hydrocracking of normal paraffins.

7 Claims, No Drawings

CATALYST FOR HYDROCARBON CONVERSION

BACKGROUND OF THE INVENTION

The present patent application refers to a process for the preparation of a catalyst suitable for the conversion of hydrocarbons, in which tungsten is incorporated into erionite by contacting the erionite with a non-aqueous solution of one or more tungsten salts, and in which the erionite is washed and dried after the incorporation of the tungsten.

Erionite is a crystalline zeolite having the chemical formula $(Ca, Mg, Na_2, K_2)_{4.5}Al_9Si_{27}O_{72}.27H_2O$. Erionite is thus characterized by the high atomic proportion of silicon with respect to aluminum and by its crystalline structure.

For a detailed description of erionite reference is made to "Mineralogical Magazine", Vol. 32, No. 247 (December 1959), pages 261–281, and to the book entitled "Non-stoichimetric compounds" published by Lyon Mandelcorn (Academic Press, 1964), pages 367–437.

SUMMARY OF THE INVENTION

The invention provides a process for the preparation of a tungsten-containing catalyst suitable for the conversion of hydrocarbons, which comprises contacting erionite with a non-aqueous solution of at least one tungsten salt, washing the product to remove non-exchanged tungsten, drying the product, mixing the tungsten-exchanged erionite with carbon powder, shaping the mixture and removing the carbon by burning.

The invention further provides the novel catalyst prepared according to said process, and a process for selective hydrocracking a hydrocarbon feedstock containing n-paraffins which comprises contacting said feedstock with said catalyst in the presence of hydrogen at an elevated temperature and pressure.

DESCRIPTION OF PREFERRED EMBODIMENTS

For the preparation of the catalyst according to the present invention, use can be made of natural as well as synthetic erionite, for example zeolite T. The erionite is preferably in particulate form, especially as a powder.

Although the present process permits the incorporation of tungsten by ion-exchange into erionite which is absolutely dry, this metal can be brought into ion-exchange with erionite from its non-aqueous solution considerably more rapidly if this sieve contains water. For this reason it is preferred to use water-containing erionite. The percentage of water in the erionite may vary within very wide limits, but it has been found that the best results are obtained with a water content of between 10 and 30% by weight.

In general, natural or synthetic erionite contains an alkali metal and/or an alkaline earth metal. The presence of these metals has an adverse effect on the catalytic properties of the erionite since it reacts as a base and thus neutralizes wholly or partly the acid function of the erionite which is essential to a proper catalytic activity. For this reason use is preferably made in the present process of erionite which is in the ammonium form, i.e. in which the alkali metal and alkaline earth metal ions are replaced by ammonium ions. During the treatment of the erionite with the non-aqueous solution of a tungsten salt, at least some of the ammonium ions are replaced by tungsten ions. Any remaining portion of the ammonium ions can be converted into hydrogen ions by simple heating of the erionite, and this is accompanied by an increase of the acid function. Moreover, it has been found that there is a better ion-exchange when the erionite is in ammonium form than when it is in the form of hydrogen, alkali metal and/or alkaline earth metal.

For the purpose of converting the erionite into the ammonium form, use can be made of any organic or mineral ammonium compound. By "ammonium compound" as used herein is meant any compound or any mixture capable of forming ammonium ions.

The ammonium part of this compound is preferably $NH_4$, but may, if desired, by any other mono-, di-, tri- or tetraalkyl, aryl, alkenyl, arylalkyl or alkylaryl ammonium group, or a hydrazonium group.

The anionic part of the ammonium compound may be any anion desired, for example fluoride, chloride, sulphate, nitrate.

It is preferred to use neutral and non-acidic, ammonium compounds. Particularly preferred are the simple mineral compounds such as $NH_4OH$, $NH_4Cl$, $NH_4NO_3$, the ammonium sulphates, the ammonium phosphates, etc. If desired, use may also be made of mixtures of ammonium compounds.

The treatment with an ammonium compound is preferably carried out with a solution of such a compound. For this treatment use can be made of any solvent which permits the formation of ions. However, preference is given to aqueous solutions.

The concentration of the solution may vary within very wide limits. Preferred are solutions within the range of from 0.1–12 N, particularly those between 0.1 and 10 N; excellent results have been obtained when employing a 2-N concentration.

The pretreatment with the ammonium compound may be carried out at any desired pressure, but is preferably effected at an elevated pressure e.g. 1.0–10 bar, preferably 2–8 bar; very good results have been obtained at about 5 bar.

The temperature at which the treatment with the solution of an ammonium compound is carried out, may in principle vary within wide limits. It is preferred, however, to carry out this treatment at a temperature between 0°C and 200°C, particularly at a temperature between about 20°C and 200°C, for example at 150°C at which excellent results have been obtained.

It has been found advantageous to repeat and/or to prolong the treatment with the ammonium compound until the treated material of the support evolves no more sodium and potassium. It may be desirable to carry out a drying operation, preferably at a temperature between 100°C and 250°C, after the pretreatment(s) with the ammonium compound.

According to the invention erionite is contacted with a non-aqueous solution of one or more tungsten salts. In principle, any non-aqueous solvent in which the said salts are sufficiently soluble, is suitable for the purpose. Polar or polarizable solvents can be used with advantage. Examples of suitable solvents are: acetone, dioxane, pyridine, tetrahydrofuran, ethylether, ethylacetate, dimethylformamide, methanol, ethanol, isopropanol and n-butanol. It is preferred, however, to use isopropanol since with this solvent the said salts exchange ions with erionite rapidly and in large quantities.

The ion exchange with the non-aqueous solution of the tungsten salt can be effected at any combination of temperature and pressure at which the solvent is present in the liquid state. For economic reasons it will be preferred to select a temperature which is lower than the boiling point at atmospheric pressure of the solvent used, the selected temperature generally not being below 10°C to prevent the ion exchange from being too slow.

Most non-aqueous solvents yield good results even at ambient temperature. Preferably, ion exchange takes place at a temperature in the range of from 10°C to 200°C, since in this temperature range approximately 80% of the maximum possible ion exchange is achieved within 5 hours.

For the ion exchange according to the invention use can be made of any tungsten salt capable of dissolving in an adequate quantity in the non-aqueous solvents used, while liberating metal cations. In general, suitable salts are bromide, chloride and fluoride, tungsten hexachloride ($WCl_6$) being preferred.

To effect a rapid and thorough ion exchange between the non-aqueous solution of the tungsten salt and the erionite, the quantity of dissolved tungsten salt will, in general, be so selected as to exceed the quantity corresponding with the maximum ion exchange capacity of the erionite. It is preferred to use a quantity of tungsten salt corresponding to 100–200% of the ion-exchange capacity of the erionite.

For a rapid and thorough ion exchange it is important that the pH of the non-aqueous solution of the tungsten salt should be between certain limits. It has been found that good results are obtained with a pH between 0.1 and 4. For this reason it is preferred to use a pH in this range. The pH of the non-aqueous solution to be used may be brought to the desired value by means of a mineral or organic acid or a mineral or organic basic-reacting substance.

To effect the desired ion exchange the erionite is contacted with a non-aqueous solution of the tungsten salt to be incorporated. To this end the erionite is preferably suspended in the solution, whereupon the resulting suspension is stirred. Preferably the amount of liquid is 500–2,000 ml per 100 g of erionite. This treatment is preferably continued for a period of from 1 to 48 hours in order to obtain the maximum possible exchange of the zeolite cations with the tungsten ions from the solution.

On completion of the ion exchange the excess solution is separated by filtration as much as possible in order to remove the metal that is not ion-bound to the erionite but is dissolved in the remaining solvent and could lead to the formation of an undesirable deposit of tungsten compound. For this reason it is preferred to wash the erionite with a non-aqueous solvent after filtration. To this end use can suitably be made of the same solvent as that in which the tungsten ions were dissolved during the ion exchange.

After incorporation of all the components in the catalyst, the latter is preferably dried and calcined. The best results are obtained if the drying is carried out during a period varying from 1 to 12 hours, at a temperature between 50°C and 200°C and if desired the calcination is carried out for a period varying from 30 minutes to 10 hours at a temperature between 450°C and 650°C. These conditions are, therefore, preferred. The latter treatment results in a further strengthening of the adhesion between the tungsten and the erionite, thus very favorably affecting the stability of the final catalyst.

This catalyst may be used as such. However, the mechanical properties, such as the crushing strength of the resulting catalyst, may be further improved by incorporating the catalyst in a matrix consisting of a refractory material. A matrix consisting of a clay or a mixture or a compound of silica or alumina is very suitable for this purpose.

The erionite and the matrix can be mixed in the dry state. It is preferred, however, to mix them in the presence of water, since this method permits a more intimate contact between the two components of the catalyst support. The amount of water present during mixing should, preferably, be at least equal to the total pore volume of the erionite and of the matrix. The mixing is preferably carried out at a temperature between 20°C and 300°C, with or without pressure, in an inert atmosphere.

Another suitable method comprises incorporating the erionite in the matrix during the preparation of the latter. In this method the erionite is added to a hydrogel of hydrated silica and/or alumina, and intimately mixed therewith; the hydrogel is subsequently dried. Alternatively, the hydrogel may be precipitated in the presence of the erionite, whereupon the excess water is removed from the mixture.

On completion of the treatment described above a catalyst is obtained in particulate form e.g. as dry powder. The product thus formed can be used as final catalyst preferably after pelletizing or extrusion, but it has now been found that the catalyst thus formed can be further improved by mixing it in powder form with carbon powder, shaping this mixture as desired and subsequently burning the carbon.

The invention therefore relates to a process for the preparation of a catalyst suitable for the conversion of hydrocarbons, in which tungsten is incorporated into erionite by contacting the erionite with a non-aqueous solution of one or more tungsten salts, and in which the erionite is washed and dried after the incorporation of the tungsten, characterized in that the tungsten-exchanged erionite powder is mixed with carbon powder, that this mixture is shaped as desired and that the carbon is removed by burning. Although any powdered natural or synthetic erionite, into which tungsten has been incorporated by ion exchange, and any carbon powder can be used in the process according to the invention, preference is given to erionite powders with a particle size below 0.2 mm in diameter and to carbon powders with a particle size below 0.2 mm in diameter, which powers give the best results.

The ratio in which the tungsten-containing erionite powder and the carbon powder are mixed, may vary between wide limits. It is, however, preferred to mix 100 parts by weight of tungsten-exchanged erionite powder with 1–10 parts by weight of carbon powder. When the mixing ratio of tungsten-exchanged erionite and carbon is between these limits, the activity of the catalyst is substantially increased. When less than 1 part by weight of carbon is added to 100 parts by weight tungsten-exchanged erionite, the increase in the activity of the final catalyst is hardly perceptible. The addition of more than 10 parts by weight of carbon to 100 parts by weight of tungsten-exchanged erionite renders the desired shaping of the final catalyst (e.g. pelletizing or extrusion) difficult.

After the mixing of the tungsten-exchanged erionite powder with the carbon powder, the mixture is shaped as desired. For use in fixed catalyst beds, the catalyst and carbon powder is preferably pelletized or extruded after being wetted.

After the catalyst has been suitably shaped, the carbon is removed by burning. The combustion is preferably carried out with a gas mixture containing 0.5–21% by volume of oxygen and 99.5–79% by volume of nitrogen, the duration of the combustion being between 1 and 24 hours, the temperature between 550° and 800°C, the pressure between 1 and 10 bar and the gas rate between 500 and 3000 l (N.T.P.) per hour and per kg of catalyst. The catalyst is then ready for use.

For several purposes even better results can be obtained if the catalyst is used in reduced form. To this end the catalyst is preferably reduced by means of a gas containing hydrogen, at a temperature between 300° and 600°C, a pressure between 1 and 100 bar, a gas rate between 10 and 10,000 l (N.T.P.) per hour and per kg of catalyst, and for a period between 1 and 24 hours.

The catalyst obtained by the present method is very suitable for various catalytic processes. In view of its uniform pore diameter, it is particularly suitable for selective catalytic processes, in which in a mixture of compounds having linear and branched structures only those having a linear structure are converted, since only the latter are capable of penetrating into the erionite. Examples of such catalytic processes are the selective hydrocracking and dehydrogenation of n-paraffins, the selective hydrogenation, hydration and amination of straight-chain alkenes, and the selective dehydrogenation of straight-chain alcohols in mixtures containing these compounds together with related compounds having a branched and/or cyclic structure.

The invention also relates to a process for the selective hydrogenative cracking of hydrocarbon oils by means of the catalyst described. To this end these hydrocarbon oils are contacted with this catalyst at elevated temperature and pressure and in the presence of hydrogen.

This process is especially suited for improving hydrocarbon mixtures obtained by straight run distillation or by catalytic reforming and for the simultaneous production of propane and butane, since relatively small amounts of methane and ethane are formed. For this purpose low-boiling feedstocks, such as tops or naphthas are hydrocracked. Feedstocks having a final boiling point lower than 250°C are very suitable and particular preference is given to feedstocks having a boiling point within the range of from 50°C to 200°C. The reaction temperature in the hydrogenative cracking according to the process of the present invention is preferably between about 300°C and 500°C, more especially between about 350°C and 450°C. The partial pressure of hydrogen is preferably selected between 5 and 200 bar, more especially between about 5 and 100 bar. The LHSV (liquid hourly space velocity) is preferably between 0.1 and 10 liters of oil per hour per kg of catalyst, more especially between 0.5 and 5 liters of oil per hour per kg of catalyst. The molar ratio between the hydrogen and the oil during the reaction is preferably between about 1:1 and about 50:1, more especially between about 5:1 and about 20:1. When a catalytic reformate at elevated temperature and pressure and in the presence of hydrogen, is passed over the catalysts prepared in accordance with the invention, the n-paraffins present in the product are selectively cracked into low-boiling paraffins, particularly propane and butane, while the isoparaffins and the aromatics remain unchanged. By this treatment the octane number of the catalytic reformate is considerably improved.

The process of the invention will now be further elucidated by the following Examples.

EXAMPLE I

A catalyst was prepared by suspending 100 g of erionite in the ammonium form in a solution of 26 g of tungsten hexachloride ($WCl_6$) in 1000 ml of isopropanol, and by stirring them for 48 hours at 20°/25°C. During this period ammonium ions from the erionite were exchanged with tungsten ions from the solution. The erionite was then filtered off, dried for 10 hours at 120°C and calcined for 1 hour at 530°C. This catalyst contained 8 parts by weight of tungsten to 100 parts by weight of erionite.

EXAMPLE II

A catalyst containing 8% by wt of tungsten supported on erionite was prepared by ion exchange from a solution of tungsten hexachloride in isopropanol and by filtering, drying and calcining as described in Example I and by pelletizing the catalyst. This catalyst was reduced with hydrogen at a temperature of 450°C, a pressure of 10 bar, a gas rate of 1250 liters (N.T.P.) at normal temperature and pressure per hour per kg of catalyst and during a period of 12 hours. This catalyst was then used for conversion of a mixture of hydrocarbons, resulting in improved octane number of the principal product.

The feedstock had an initial boiling point of 40°C, a final boiling point of 166°C and an F-1-0 octane number of 88.6 (F-1-0 is the octane number determined by the "Research Method" of a gasoline which does not contain lead compounds). The following conditions were used:

| | |
|---|---|
| Temperature: | 400°C |
| Pressure: | 10 bar |
| LHSV: | 2 liters per hour per kg of catalyst |
| $H_2$/oil ratio: | 1,250 liters (N.T.P.)/kg |

This operation yielded 86.3% by wt of a gasoline containing pentane and higher-boiling constituents, which gasoline has an improved F-1-0 octane number of 97. The remaining 13.7% by wt consisted of a mixture of propane, isobutane and n-butane, the ratio between the $C_3$ paraffins and the total of $C_1 + C_2 + C_3 + C_4$ being 0.93. This mixture is very suitable for the manufacture of liquified petroleum gases.

EXAMPLE III

A catalyst containing 8% by wt of tungsten supported on erionite was prepared by ion-exchanging erionite in the ammonium form with a tungsten hexachloride solution in isopropanol and by filtering, drying and calcining as described in Example I.

A quantity of 96 g of this catalyst in powdered form (particle size 0.2 mm) were mixed with 4 g of carbon powder (particle size 0.2 mm). This mixture was then pelletized and with a view to the combustion of the carbon, the pellets were treated for an hour with a gas mixture containing 21% by volume of $O_2$ and 79% by volume of $N_2$, at a temperature of 530°C, a pressure of 1 bar and a gas rate of 500 liters (N.T.P.) per hour per kg of catalyst. This catalyst was then reduced for 12 hours by means of a hydrogen stream at a temperature of 450°C, at a pressure of 10 bar and a gas rate of 1250 liters (N.T.P.) per hour per kg of catalyst.

This catalyst was used to convert an identical mixture of hydrocarbons as used in Example II, under the same reaction conditions as used in that Example, except that the temperature was only 380°C.

This operation yielded 85.3% by wt of a gasoline containing pentane and higher-boiling constituents, which gasoline had an improved F-1-0 octane number of 97.5. The remaining 14.7% by wt consisted of a mixture of propane, isobutane and n-butane, the ratio between $C_3$ paraffins and the total of $C_1 + C_2 + C_3 + C_4$ being 0.9. This mixture is very suitable for the manufacture of liquified petroleum gases.

A comparison of the result of Example III with that of Example II reveals that the process according to the invention enables a considerably better result to be achieved than when a tungsten-containing erionite catalyst as such is used, viz. without mixing with carbon and without combustion of the latter.

What is claimed is:

1. A process for the preparation of a tungsten-containing catalyst suitable for the conversion of hydrocarbons, which comprises contacting particulate erionite with a non-aqueous solution of at least one tungsten salt to exchange tungsten into the erionite, washing the product to remove non-exchanged tungsten, drying the product, mixing the tungsten-exchanged erionite with carbon powder having an average particle size of 0.2 mm or less in diameter, shaping the mixture and removing the carbon by burning.

2. A process as in claim 1, wherein the erionite has an average particle size of less than 0.2 mm in diameter.

3. A process as in claim 1 wherein in the mixing step the mixing ratio is 100 parts by weight of tungsten-exchanged erionite to 1-10 parts by weight of carbon powder.

4. A process as in claim 1 wherein the shaping step comprises wetting followed by extrusion.

5. A process as in claim 1 wherein for the removal of carbon by burning step the combustion is effected by means of a gas mixture containing from 0.5 to 21% by volume of oxygen and from 99.5 to 79% by volume of nitrogen, the duration of the combustion being between 1 and 24 hours, the temperature between 550° and 800°C, the pressure between 1 and 10 bar and the gas rate between 500 and 3000 l (N.T.P.) per hour per kg of catalyst.

6. A process as in claim 1, comprising the further steps of reducing the catalyst by means of a gas containing hydrogen at a temperature between 300° and 600°C, a pressure between 1 and 100 bar, a gas rate between 10 and 10,000 l (N.T.P.) per hour per kg of catalyst and for a period between about 1 and 24 hours.

7. A catalyst for the conversion of hydrocarbons, prepared by the process of claim 1.

* * * * *